United States Patent [19]

Alsing

[11] Patent Number: 4,927,080
[45] Date of Patent: May 22, 1990

[54] FIELD SPRAYING DEVICE

[75] Inventor: Erik Alsing, Nivå, Denmark

[73] Assignee: Hartvig Jensen & Co. A/S, Glostrup, Denmark

[21] Appl. No.: 299,415

[22] Filed: Jan. 23, 1989

[30] Foreign Application Priority Data

Jan. 25, 1988 [DK] Denmark .............................. 336/88

[51] Int. Cl.⁵ ........................... B05B 1/20; B05B 3/12
[52] U.S. Cl. ..................................... 239/77; 239/172; 239/292; 239/295
[58] Field of Search ................. 239/77, 172, 290, 292, 239/295, 299, 300; 114/108

[56] References Cited

U.S. PATENT DOCUMENTS

| | | | |
|---|---|---|---|
| 2,836,932 | 6/1958 | Potter | 239/77 |
| 3,472,454 | 10/1969 | Blue et al. | 239/77 |
| 4,274,589 | 6/1981 | Jones | 239/172 |
| 4,583,319 | 4/1986 | Wolff et al. | 239/292 |
| 4,619,216 | 10/1986 | Crear, III et al. | 114/108 |

FOREIGN PATENT DOCUMENTS

14546/83 12/1983 Australia .
1564543 3/1969 France .

OTHER PUBLICATIONS

"The New Sprafoil Field Sprayer", D & W Industries, Sioux Falls S.D. 57101, four pages, date unknown.
Danfoil brochure, foreign language edition, date unknown.
Danfoil brochure, English version, date unknown.

*Primary Examiner*—Andres Kashnikow
*Assistant Examiner*—Karen B. Merritt
*Attorney, Agent, or Firm*—Hill, Van Santen, Steadman & Simpson

[57] ABSTRACT

A field spraying device comprises an elongated spray beam provided with a plurality of spray nozzles (12). The field spraying device comprises an at least partially inflatable hose (18) connectable to a compressed-air source. The hose comprises a slotted discharge opening (13) extending in the longitudinal direction of the hose. The spray nozzles (12) spray the liquid into the air flow approximately 200-300 mm below the slotted opening which results in a uniform discharge of material. In this manner the spray beam can be situated close to the ground and the crop, respectively, with the effect that a possible wind movement is reduced. The slotted discharge opening (13) is pivotally mounted by utilizing the fact that the at least partially secured hose (18) is made of a resilient material. In other words the invention utilizes the feature that the resilient top portion allows a turning movement in such a manner that the discharge opening can be adjusted. As a result it is possible to take the velocity of the wind, the velocity of the vehicle etc. into account. Furthermore it is possible to improve the utilization of the sprayed materials and to take optimum care of the crop.

3 Claims, 4 Drawing Sheets

FIELD SPRAYING DEVICE

FIELD OF THE INVENTION

The invention relates to a spraying device comprising an elongated spray beam with a plurality of spray nozzles.

BACKGROUND ART

The known spray beams are encumbered with the drawback that they must be situated relatively far from the crop so as to achieve a substantially uniform discharging of the spraying material. A consequence thereof is an increased risk of undesired wind movement.

SUMMARY OF THE INVENTION

A spraying device of the above type is according to the invention characterized by comprising an at least partially inflatable hose connectable to a compressed-air source, said hose comprising one or more slotted discharge openings extending in the longitudinal direction of the hose.

As a result a very uniform discharging of the material is obtained, and the spray beam can be situated close to the ground and the crop, respectively. As a result the wind movement is reduced.

Moreover according to the invention the slotted discharge opening(s) may be pivotally mounted by utilizing the feature that the hose is made of a resilient material. In other words the invention utilizes the feature that the resilient top portion allows a turning movement in such a manner that the discharging direction can be adjusted. Additionally, it is possible to take the wind velocity, the velocity of the vehicle etc. into account. In other words it is possible to improve the utilization of the sprayed materials simultaneously with taking optimum care of the crop.

BRIEF DESCRIPTION OF THE DRAWINGS

The invention is described in greater detail below with reference to the accompanying drawing, in which.

DESCRIPTION OF PREFERRED EMBODIMENTS

Figure 1:
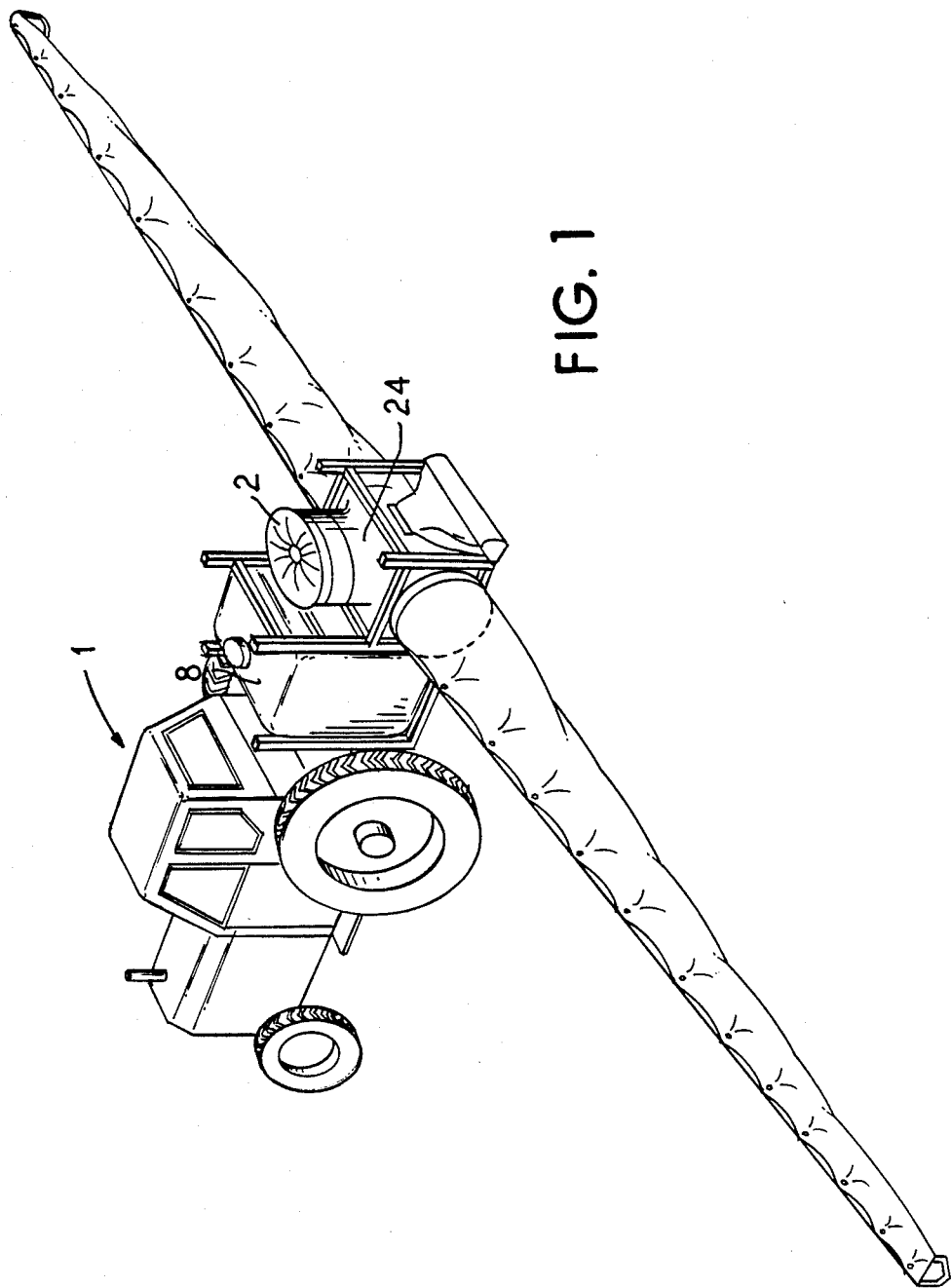
FIG. 1 is a perspective view of a field spraying device according to the invention.
Figure 2:
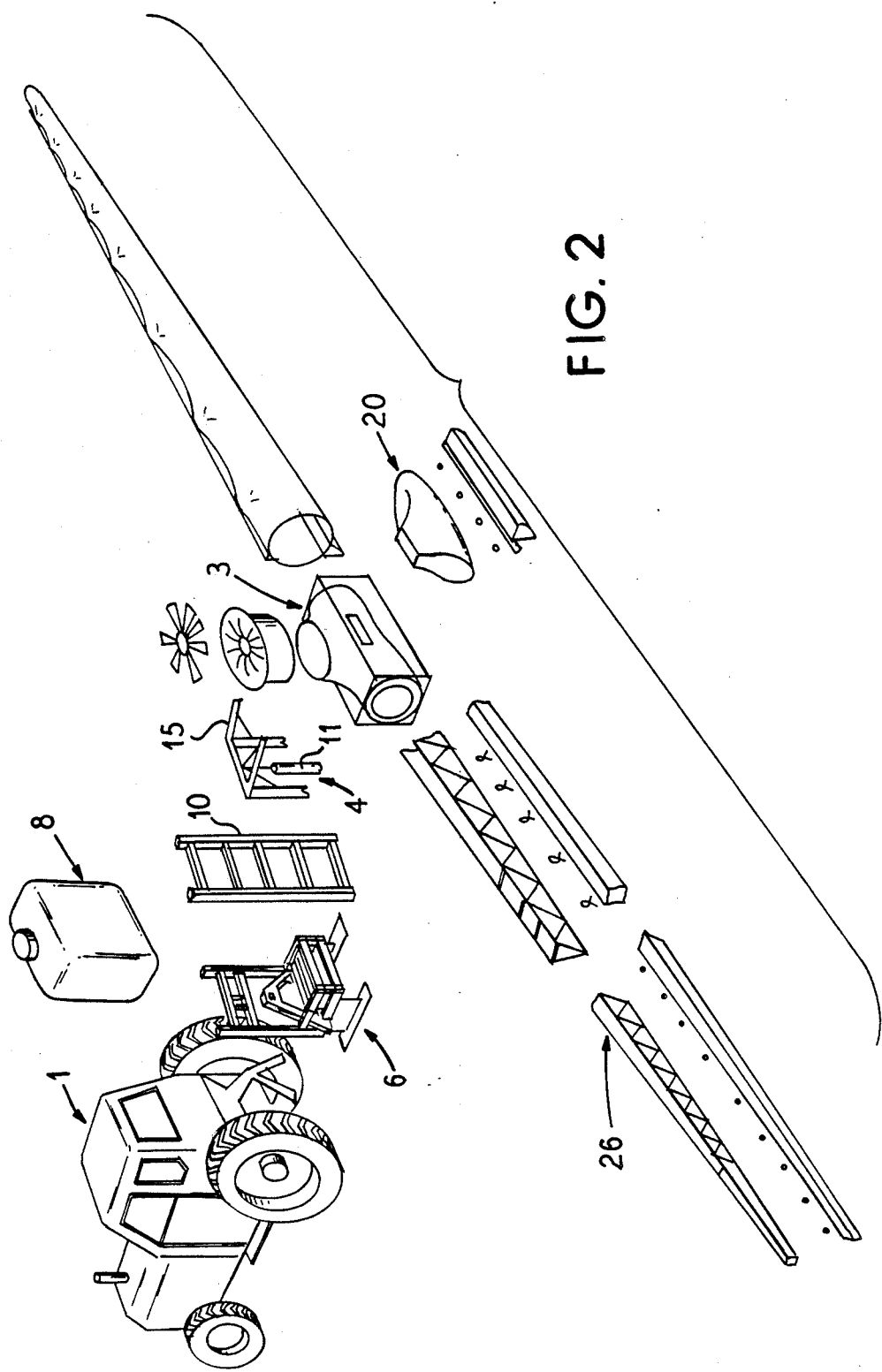
FIG. 2 is an exploded view of the spraying device of FIG. 1.
Figure 3:
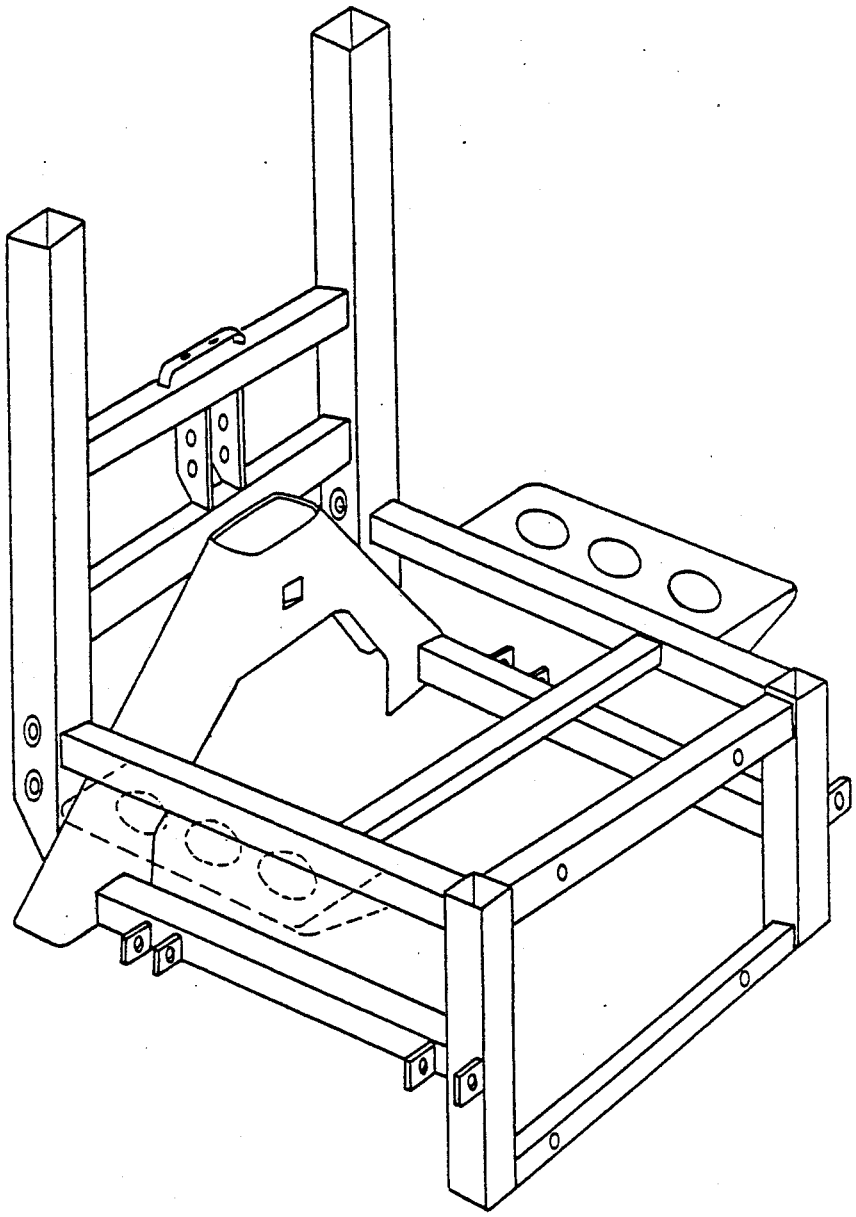
FIG. 3 is a perspective view of the frame of FIG. 2 on a larger scale.

As the crops differ it is necessary to have a possibility of attacking the plants in such a manner that the highest amount of liquid from the air flow comes into contact with the plants. In connection with sturdy, upright crops the spraying material must come into contact with the ground, and consequently the latter requires an air flow along the growing direction of the plants in order to ensure a maximum depositing of the spraying liquid.

Thin, short crops come often into contact with a high amount of spraying liquid when the air-liquid flow follows a maximum distance from the top to the bottom of the plant to be sprayed. Weed control on ground without crops or with short crops at an early stage of the growth thereof also require a rearward discharging or discharging at a predetermined angle of the air-liquid mixture. The air and the liquid cause the small plants to move in such a manner that both the bottom and the top side of the blades come into contact with the air-liquid flow. In addition it is of extreme importance that it is possible to spray along the inclination of the crop, because then it is possible to come into contact with and to deposit the liquid on the ground.

The spraying is more or less sensitive to wind, especially when small nozzles and high pressures are involved. Usually large nozzles or low pressure are recommended in connection with sprayings where the surrounding wind is higher than 4–6 m/sec because the drop size is thereby increased. The latter is substantially caused by large drops possessing a higher energy than small drops. Accordingly, the large drops have a substantially better chance of coming into contact with the article to be sprayed. The air-liquid system has the effect that even the small wind-sensitive drops are fed with part of the energy of the controlled air flow, which prevents the surrounding air from removing the drops from the article to be sprayed.

The system allows a spraying by means of small nozzles spraying only small amounts of liquid even at wind velocities exceeding 6 m/sec. As a result the capacity is higher than previously known.

A movable slot system allows a spraying against the wind irrespective of the fact whether the vehicle follows the direction of the wind or not.

The spraying device according to the invention provides an artificial wind which is utilized for stirring up the crop in such a manner that the spraying liquid can come into contact with the ground. A blower 2 (an axial blower) is used, and it is mounted on a centrally situated lift vehicle or elevator platform 4 on the spraying device in such a manner that the blower 2 follows a beam 26 as it moves up and down. The tractor 1 carries the entire spraying device in a conventional threepoint suspension. The spraying device comprises a frame 6 and a container 8 with the spraying liquid. The frame 6 is made of square steel pipes, see FIG. 3. Two vertical side members 10 are secured to the frame 6, and the lift vehicle 4 is moved up and down the side members 10 by means of a hydraulic cylinder 11. The lift vehicle 4 is furthermore provided with a projecting fork 15 supporting the beam 26. As a result the entire beam 26 can be moved up and down, which allows a variation of the height above the ground between 300 and 1900 mm. The beam 26 can be bent or folded in two or more points in such a manner that it can be turned towards the container 8 and the tractor 1. The beam 26 is provided with nozzles 12 at regular intervals of approximately 0.5 m. The nozzles 12 communicate with a liquid distributor pipe 17. The nozzles 12 and the air blown out of an elongated slot 13 must follow one another if the direction is varied. The continuous slot 13 is provided at the bottom of the beam 26, said slot only being interrupted in the bending points of the beam 26. The slot 13 is mounted or situated on a pipe 14 and can be turned about said pipe in order to alter the angular position depending on whether it should be directed slightly forward or backward. The angular position of the pipe 14 is controlled by a hydraulic cylinder 16, one end of which is connected to a rod **14*a*** projecting from the turnable pipe 14, and the opposite end of which is connected to the central beam 26a. Hydraulic hoses (not shown) are connected to the hydraulic cylinders 16. The pipe 14 is furthermore provided with several fittings supporting the nozzles 12 in such a manner that the liquid is sprayed into the air flow approximately 200–300 mm below the nozzle openings with the effect that the liquid drops sprayed out do not just flow away. The slot 13 is preferably formed by means of rigid plastic members. The plastic members are shaped in such a manner that the rim of a flexible tarpaulin 18 can be pulled into two grooves and retained therein. The tarpaulin 18 is made of plastics, where a rope is welded into each side or edge, for instance in such a manner that the two ropes can be inserted in the grooves and retained therein. The tarpaulin 18 is of a varying width and forms an elongated bag and is for instance made of DACRON (polyester canvas), PVC or polyethylene. A pipe of a diameter of approximately 100 mm at the end is provided. The diameter increases towards the center, and at the blower 2 it is about 500 mm. As a result, a uniform distribution of the air along the slot 13 is obtained. An air "carpet" must exist along the entire slot and in the same direction. The axial blower 2 with a vertical axis is situated at the center next to a T-shaped distributor pipe 3 of polyethylene distributing the air to the two channels formed by the elongated bags. The blower 2 is hydraulically driven in such a manner that it is possible to vary the velocity of the air from the slot from 0 to 30 m/sec.

At the innermost 2 m in the air is delivered through the side of the T-shaped member 3, a separate bag 20 being situated at said member.

Each beam section is connected with a hose (not shown) feeding the liquid to be sprayed, said hose being connected to the distributor pipe 17. The hydraulic cylinders turning the beam sections are connected to hydraulic hoses (not shown). The hydraulic hoses are fed by a hydraulic pump (not shown) and driven by the power output of the tractor. The hydraulic pump also feeds a hydraulic motor driving the axial blower 2. The blower 2 discharges about 1500 m³ air per h per m of beam. As stated previously, a plurality of hydraulic cylinders 16 are furthermore situated along the beam 26 for the adjustment of the direction of the nozzles 12 and the air slot 13, respectively.

Figure 4:
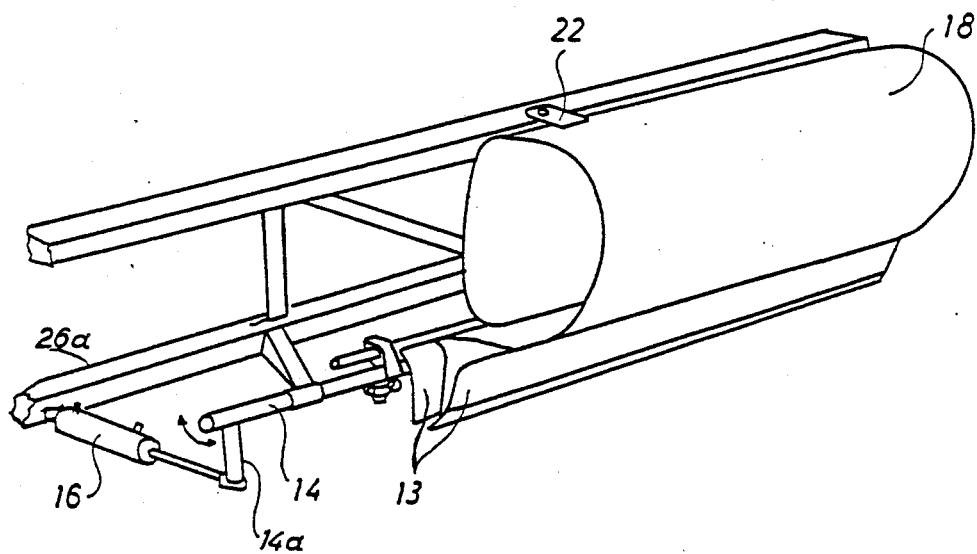
FIG. 4 is a perspective view with portions broken away of a portion of the beam on a larger scale.
Figures 5A, 5B, 5C, 5D:
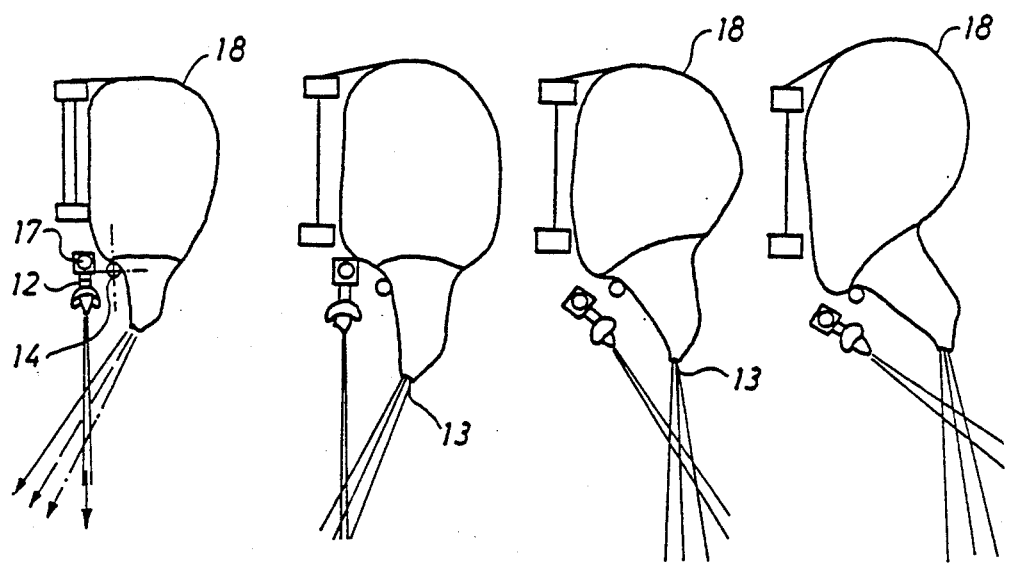
FIGS. 5a-5d illustrate the inflatable hose with the longitudinal slot together with the nozzles for the liquid to be sprayed in four different relative portions.

At the top bag 18 is secured to the beam 26 by means of a number of fittings 22, see FIG. 4.

The beam 26 is suspended in a trapezoidal beam system at 24, see FR-PS No. 1564543. Springs are furthermore provided which absorb possible shocks during the driving.

The invention thus provides a spraying device which is more flexible than previously known devices, and which improves the utilization of the materials sprayed out simultaneously with taking optimum care of the crop.

I claim:

1. A spraying device comprising an elongated spray beam with a plurality of spray nozzles, a compressed-air source, at least one partially inflatable hose connectable to said compressed-air source and extending along said beam, said hose being made of a resilient material and having at least one slotted discharge opening extending in a longitudinal direction of the hose, said slotted discharge opening being pivotally mounted on said beam by utilizing a yielding feature of the resilient material of said hose and said nozzles being fixed relative to the slotted discharge opening.

2. A spraying device according to claim 1, wherein said nozzles and openings are separately mounted in spaced relationship with the discharge of the spray nozzle forming an angle with air leaving the discharge opening at a point spaced from said nozzle and opening.

3. A spraying device comprising an elongated spray beam with a plurality of spray nozzles spaced therealong, a source of compressed air, and a partially inflatable hose being connected to said source and being mounted on said beam adjacent said nozzles, said hose being made of a flexible material and having at least one slotted discharge opening positioned adjacent said nozzles, said spraying device including means for mounting said opening for pivotal movement along an axis extending parallel to the beam with the hose yielding in shape and the nozzle being mounted separate from the slotted discharge opening so that a discharge of the nozzle intersects a discharge of the opening at a point spaced from the nozzle and opening and at an angle adjusted by the means for mounting.

* * * * *